United States Patent [19]

Bukoschek et al.

[11] Patent Number: 4,520,286
[45] Date of Patent: May 28, 1985

[54] APPLIANCE DRIVEN BY AN ELECTRIC MOTOR

[75] Inventors: Romuald L. Bukoschek, Klagenfurt, Austria; Gerhard Diefenbach, Aachen, Fed. Rep. of Germany

[73] Assignee: U.S. Philips Corporation, New York, N.Y.

[21] Appl. No.: 505,018

[22] Filed: Jun. 16, 1983

[30] Foreign Application Priority Data

Sep. 7, 1982 [AT] Austria ................. 3346/82

[51] Int. Cl.³ .............. H02K 33/10; H02K 7/118; H02K 7/10
[52] U.S. Cl. .................. 310/83; 192/143; 200/61.46; 310/39; 310/41
[58] Field of Search ............ 310/41, 31, 39, 47, 310/50, 83; 200/61.46, 61.39; 192/143

[56] References Cited

U.S. PATENT DOCUMENTS

| | | | |
|---|---|---|---|
| 3,123,192 | 3/1964 | Wagner | 310/41 |
| 3,495,107 | 2/1970 | Haydon | 310/49 R |
| 3,955,661 | 5/1976 | Popper et al. | 192/143 |
| 4,004,168 | 1/1977 | Haydon | 310/41 |
| 4,315,170 | 2/1982 | Penn | 310/39 |

FOREIGN PATENT DOCUMENTS 2021395 12/1979 United Kingdom .

Primary Examiner—Peter S. Wong
Assistant Examiner—D. L. Rebsch
Attorney, Agent, or Firm—Rolf E. Schneider

[57] ABSTRACT

An electrically driven appliance such as a citrus press comprises a drivable tool; a self-starting single-phase synchronous motor including a diametrically magnetized permanent-magnet rotor forming a rotor field and positioned between two stator poles forming a stator field; and a drive mechanism arranged between the motor and the tool, for driving the latter, such mechanism including a plurality of drive elements each engaging the adjacent element or elements. A stalling device coacts with one drive element having a pair of stops, the stalling device including a member alternately engageable with such stops after a specific number of revolutions of the rotor in either direction of rotation, such engagement effecting stalling of the rotor and automatic reversal of the direction of the rotation of the rotor. The physical relationship of the stalling device member and the stops to each other is such that the rotor is stalled in positions wherein the angle between the rotor-field vector intersecting the rotor axis and a line intersecting the rotor axis perpendicularly to the stator field lies within an angular range of 60° in each direction of rotation of the rotor.

3 Claims, 2 Drawing Figures

APPLIANCE DRIVEN BY AN ELECTRIC MOTOR

This invention relates to an electrically driven appliance, for example a citrus press, an onion cutter or the like, in which a tool is driven by a self-starting single-phase synchronous motor via a drive mechanism, which motor comprises a diametrically magnetized permanent-magnet rotor for the formation of a rotor field, which rotor is positioned between two facing stator poles which form a stator field, and a stalling device including stops, which stall the rotor after a specific number of revolutions in at least one direction of rotation, upon which the direction of rotation is reversed automatically. Such an appliance is known from published British application No. 2,021,395A.

It is the object of the present invention to improve the operation of such an appliance so as to obtain an exact and reliable reversal of the direction of rotation of the rotor without undesired oscillatory effects or so-called sputtering. According to the invention the stalling device stalls the rotor in positions in which the angle between the rotor-field vector which intersects the rotor axis and a line which intersects the rotor axis perpendicularly to the stator field lies within an angular range of 60° in each direction of rotation of the rotor. Thus, the rotor is stopped and reversed only in positions in which the motor exhibits a large driving torque, which ensures that it is started correctly in the opposite direction of rotation. Such a large driving torque during the reversal of the direction of rotation is also important because the stalling device may present an additional load to the motor.

The positions in which the rotor is stopped by the stalling device may be defined in a suitable manner when the stalling device is provided with adjustable stops. In an appliance in which the tool is driven by the single-phase synchronous motor via a positive drive mechanism, the stalling device acting on a drive element of said mechanism, the construction and assembly of the appliance are simplified if the drive mechanism between the motor and the drive element on which the stalling device acts has an integral transmission ratio and the drive element and a stationary part of the appliance are provided with marks which, when they are made to coincide, define the rotor positions in which the rotor is stopped by the stalling device. This not only results in a simple construction of the appliance, but bringing the marks into register during assembly of the appliance without the use of an additional adjusting device ensures that the stalling device stops the rotor at the desired positions in which a satisfactory driving torque is available. The marks may take various forms, for example lines, recesses etc.

A very simple construction is obtained if the stalling device which acts on the drive element includes an arm which is pivotally connected to the appliance and which has a free end that is guided in a groove formed in the drive element and which is closed at both ends to define the positions where the rotor is stopped by the stalling device.

Such a groove may be for example a helical screw-thread-like groove formed in a cylindrical projection of the drive element. However, a very compact construction is obtained if the groove is spiral-shaped and is formed in a side face of a gear-wheel which forms the drive element.

The invention will now be described in more detail with reference to the accompanying drawings, in which.

Figure 1:
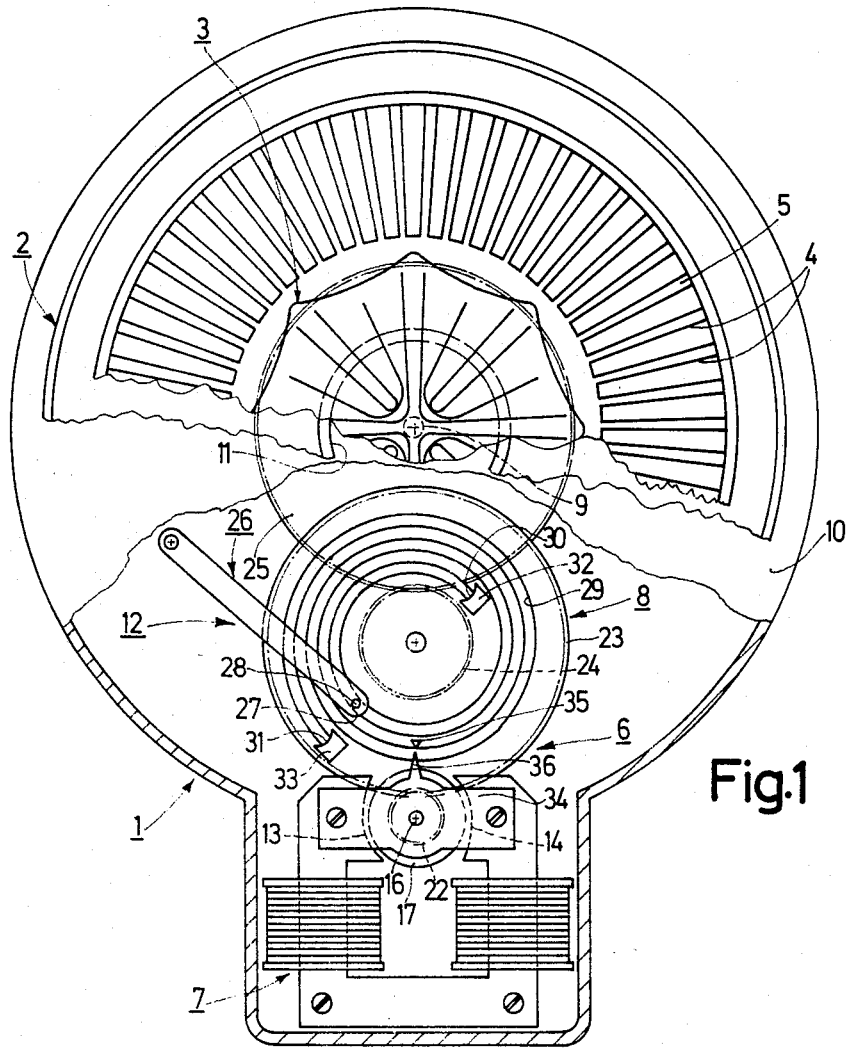
FIG. 1 is a plan view, partly in section, of a citrus press, whose pressing cone is driven by a self-starting single-phase synchronous motor via a gear mechanism, the stalling device acting on a gear wheel of the gear mechanism.

The citrus press shown in FIG. 1 comprises a base 1, a receptacle 2 and a rotatable pressing cone 3, which is integral with a strainer 5 in which apertures 4 are formed. The base 1 accommodates a drive unit 6 for the pressing cone 3, which unit comprises a self-starting single-phase synchronous motor 7 and a gear mechanism 8 by which a spindle 9 is driven, which spindle is journalled in the base 1, projects vertically from said base 1 and engages the pressing cone 3. The receptacle 2 is angular and is placed on a horizontal supporting surface 10 of the base 1, the spindle 9 extending through the central aperture 11 of the receptacle 2. When the pressing cone 3 is placed onto the free end of the spindle 9, the strainer 5, which is integral with said cone, is then situated within the receptacle 2, so that extracted juice flows down the pressing cone 3 into the receptacle 2 through the apertures 4 in the strainer 5.

The pressing action is promoted when the direction of rotation of the pressing cone is reversed periodically. The pressing cone may perform one or more full revolutions in one direction of rotation or may be rotated through less than 360° before its direction of rotation is reversed. In known manner such a reversing rotary movement is obtained simply in that the cone is driven by a self-starting single-phase synchronous motor, which comprises a diametrically magnetized permanent-magnet rotor for the formation of a rotor field, which rotor is arranged or positioned between two facing stator poles which form a stator field, because such a motor has the property that when its rotor is forced to stop its direction of rotation, it is reversed automatically. After it has completed a specific number of revolutions the rotor is stopped by means of a stalling device 12 which includes stops in the customary manner. The stalling device 12 may comprise a separate element which is driven by the motor spindle or, as in the present embodiment, it may comprise an element of the drive mechanism 8 between the motor 7 and the pressing cone 3 which will be described in more detail hereinafter.

Figure 2:
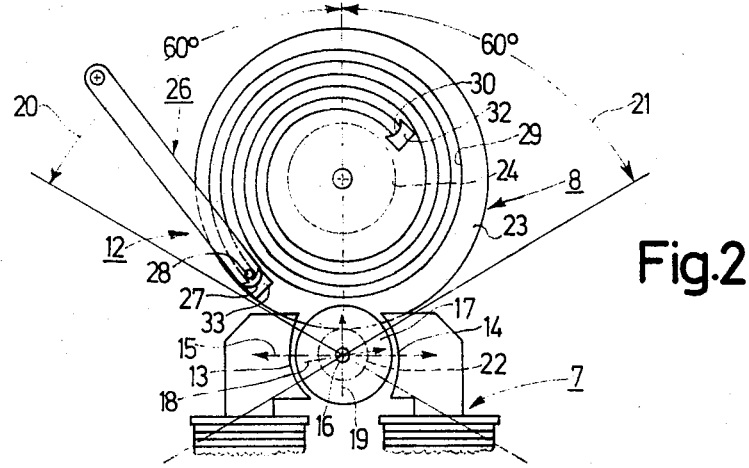
FIG. 2 shows the citrus press of FIG. 1 in a schematic partial view to illustrate the operating principle of the invention.

It has been found that such a citrus press does not always perform satisfactorily, because the cycle of movements of the pressing cone may be disturbed when the motor fails to start correctly in the reverse direction, which may be caused by the stalling device, which may present an additional load to the motor. In particular, in the case of self-starting two-pole single-phase synchronous motors with a diametrically magnetized permanent-magnet rotor, self-starting is rather critical. When the stator is not energized, the rotor of such a motor must occupy a specific rest position in which an adequate starting torque is guaranteed. This is the case if the rotor-field vector that intersects the rotor axis makes a specific comparatively small angle with the direction of the stator field. Such a rotor position can be obtained by giving the stator poles an asymmetrical shaped. FIG. 2 represents the situation when the stalling device 12 becomes operative. The stator field which extends between the stator poles 13 and 14 is indicated by the double arrow 15 and the permanent-magnet field vector that intersects the axis 16 of the diametrically magnetized rotor 17 is indicated by the arrow 18. In the rest position of the rotor 17, in which the stator is not energized, the angle between the vector 18 and the direction 15 of the stator field is approximately 9°. This ensures that the rotor can be started automatically when the motor is energized. Depending on the resulting field conditions, the rotor 17 will then rotate in one of the two directions of rotation.

If the rotor of such a motor is stalled, after which its direction of rotation is reversed automatically, starting in this opposite direction may be even more critical than self-starting from the rest position. In the case of such a forced reversal of the direction of rotation, the rotor may temporarily begin to oscillate, so that the direction of rotation is no longer reversed correctly. Such an oscillation effect is transmitted to the pressing cone via the drive mechanism 8, which mechanism itself produces noise. Under operating conditions both phenomena are unpleasant. This undesired effect can be precluded in that the stalling device 12 stops the rotor 17 in positions in which the angle between the rotor-field vector 18 that intersects the rotor axis 16 and a line, (indicated by the arrow 19 in FIG. 2), which intersects the rotor axis 16 perpendicularly to the stator field 15, lies within an angular range of (60° in each direction of rotation of the rotor 17. This range is indicated by the double arrows 20 and 21. If the rotor is in the positions described in the foregoing, the motor exhibits a comparatively large driving torque, so that the direction of rotation is reversed in a correct and reliable manner. It is found to be particularly favourable if, when the stalling device becomes operative, the rotor is in the position in which the rotor field vector 18 extends perpendicularly or substantially perpendicularly to the stator field 15. In order to insure that the rotor 17 is stalled when its rotor-field vector 18 is within the preferred angular range comprising ranges 20 and 21, the stalling device 12 should become operative when the rotor is in said preferred positions, which is readily possible by a suitable location of the stops of the stalling device.

In the present embodiment the pressing cone 3 is driven by the single-phase synchronous motor 7 via a positive drive mechanism 8, in the present case a gear mechanism comprising a gear wheel 22 mounted on the rotor spindle 16, a gear wheel 23 that is journalled on the base, which is in mesh with the first-mentioned gear wheel, and which in its turn carries a further gear wheel 24 that is in mesh with a gear wheel 25 mounted on the spindle 9. It is evident that alternatively a worm-gear or combined worm and normal gear mechanism may be used. Depending on the transmission ratio selected for this drive mechanism 8 and the desired circumferential range of the reversing rotary movement of the pressing cone 3, the stalling device 12, which includes stops and which is operative in both directions of rotation, may act on one of said drive elements. In the present embodiment this element is the gear wheel 23 and the transmission ratio between the gear wheels 22 and 23 is a whole number, which is necessary to ensure that the rotor 17 is always stopped in the same desired positions and these positions do not change after repeated stoppage for the periodic reversal of the direction of rotation.

The stalling device 12 used here is of a particularly simple and compact construction. It comprises an arm or member 26 which is pivotally connected to the appliance base and which on its free end 27 carries a pin 28 that is guided in a spiral groove 29 formed in a side face of the gear wheel 23. This groove 29 has several turns and is closed at its two ends 30 and 31, for which purpose projections 32 and 33 are provided near these ends 30 and 31, which projections cooperate with the free end 27 of the arm 26 and thus constitute abutments or stops for the stalling device. Obviously, the two ends 30 and 31 of the groove 29 may be used directly as stops with which the pin 28 on the free end 27 of the arm 26 can cooperate. Depending on the direction of rotation of the gear wheel 23 the arm is pivoted via the pin 28 outwards or inwards of the center of the gear wheel 23. This continues until the free end 27 of the arm 26 abuts with the projection 32 or the projection 33, as a result of which the gear wheel 23 is stopped. Due to the positive coupling between the gear wheel 23 and the rotor 17 of the motor 7 the rotor 17 is then forced to stop, so that the direction of rotation of the rotor 17 is reversed and the direction of rotation of the gear wheel 23 is also reversed. Upon this reversal of the direction of rotation of the gear wheel 23 the free end 27 of the arm 26 is disengaged from the relevant projection 32 or 33, after which the arm 26 is pivoted in the opposite direction via the pin 28 that slides in the groove 29, until its free end 27 abuts against the other projection 32 or 33, so that the direction of rotation of the rotor 17 is reversed again in a similar way. Thus, the gear wheel 23 performs a reversing rotary movement, which via the further gear wheels 24 and 25 is transmitted to the spindle and thus to the pressing cone 3. The number of turns of the groove 29, and consequently its length between the end 30 and the end 31, in conjunction with the transmission ratio of the drive mechanism 8 determine the periods of the periodic reversal of the direction of rotation.

FIG. 2 shows a specific position of the gear wheel 23 and the arm 26 in which the stalling device 12 just becomes operative because the free end 27 of the arm 26 abuts with the projection 33, so that the gear wheel 23 is stopped. The rotor 17 of the motor 7 then occupies a position in which the rotor-field vector 18 has substantially the same orientation as the arrow 19, which as already stated yields an optimum driving torque for the reversal of the direction of rotation of the rotor 17. The same applies if, after the reversal of the direction of rotation, the free end 27 of the arm 26 abuts against the projection 32, so that the gear wheel 23 and the rotor 17 are stopped again, the rotor 17 again occupying a position in which its rotor-field vector 18 has substantially the same orientation as the arrow 19. It is evident that the rotor 17 may also be stopped in positions which are 180°-shifted.

As is apparent from the foregoing the positions of the projections 32 and 33 determine the positions in which the rotor 17 is stopped. However, this means that during assembly of the appliance the gear wheel 23 should be mounted in the drive mechanism 8 in a specific position in which the rotor 17 of the motor 7 is in a well-defined rest position. In this respect it is found to be particularly advantageous if marks, 35 and 36 respectively, are formed on the gear wheel 23 on which the stalling device 12 acts and on a stationary part of the appliance, in the present case, the bearing shield 34 of the motor 7, as shown in FIG. 1. When these marks are in register they define the positions of the rotor in which it is stopped by the stalling device 12 after a specific number of revolutions in the two directions of rotation. In the present case the mark 35 on the gear wheel 23 is formed by an optical mark and the mark 36 on the bearing shield 34 by a pointer-shaped projection. The location of the mark 35 on the gear wheel 23 is such that if the gear wheel is so fitted that the mark 35 is in line with the mark 36 and the pin 28 on the free end 27 of the arm 26 is placed in for example the innermost turn of the groove 29 the rotor 17 will reach the desired positions as regards the orientation of its rotor field when the stalling device becomes operative. This simplifies mounting of the drive mechanism 6 and ensures that the stalling device always stops the rotor in the desired positions.

It is obvious that the marks may be formed in various manners. For example, in the gear wheel 23 a through-going bore may be formed which must be in register with a bore in the appliance, after which a pin is fitted into both bores, which pin defines the position of the gear wheel 23 during further assembly of the appliance and which is removed when assembly is completed.

A stalling device 12 as described in the foregoing is also found to be advantageous because by removing the arm 26 from the appliance an appliance can be obtained in which the tool does not perform a reversing rotary movement.

It is also found to be effective if the groove 29 of the stalling device 12 is filled with a comparatively viscous grease, so that the drive mechanism 8 is damped, which results in a smoother and less noisy operation of the single-phase synchronous motor.

It is evident that several modifications to the embodiments described in the foregoing are possible without departing from the scope of the invention. This is particularly so with respect to the construction of the stalling device. The invention may also be used in appliances other than citrus presses as described, namely in all appliances in which a tool performs a reversing rotary movement or a reciprocating movement and in which the tool is driven by a self-starting two-pole single-phase synchronous motor with a diametrically magnetized permanent-magnet rotor, whose property that the direction of rotation of the rotor is reversed automatically when the rotor is forced to stop is utilized in order to obtain the reversal of the direction of movement of the tool. Examples of appliances with a tool which makes a reciprocating movement are onion cutters or potato cutters, in which the tool is a cutter set which reciprocates at least once.

What is claimed is:

1. An electrically driven appliance such as a citrus press, which comprises a drivable tool; a self-starting single-phase synchronous motor including a diametrically magnetized permanent-magnet rotor forming a rotor field and positioned between two stator poles forming a stator field; a drive mechanism arranged between said motor and said tool for driving the latter, said mechanism including a plurality of drive elements each engaging the adjacent element or elements; and a stalling device coacting with one drive element, said one drive element having a pair of stops and being formed with a groove in a side face thereof, said groove being closed at both ends to provide said stops; said stalling device including a member alternately engageable with said stops after a specific number of revolutions of the rotor in either direction of rotation, such engagement effecting stalling of the rotor and automatic reversal of the direction of rotation of the rotor, said stalling device member comprising an arm pivotally connected at one end to the appliance and having its free end guided in said groove; the physical relationship of said stalling device member and said stops to each other being such that the rotor is stalled in positions wherein the angle between the rotor-field vector intersecting the rotor axis and a line intersecting the rotor axis perpendicularly to the stator field lies within an angular range of 60° in each direction of rotation of the rotor.

2. An appliance according to claim 1, in which the groove is spiral-shaped.

3. An appliance according to claim 1, in which the drive mechanism between the motor and the one drive element coacting with the stalling device member has an integral transmission ratio; and said one drive element and a stationary part of the appliance are provided with marks that, when made to coincide, define the positions for stalling the rotor.

* * * * *